United States Patent
Sharma et al.

(10) Patent No.: US 11,388,289 B2
(45) Date of Patent: Jul. 12, 2022

(54) METHOD AND SYSTEM FOR SOFT SKILLS-BASED CALL ROUTING IN CONTACT CENTERS

(71) Applicant: MITEL NETWORKS CORPORATION, Ottawa (CA)

(72) Inventors: Nishu Sharma, Mountain View, CA (US); Long Nguyen, Santa Clara, CA (US)

(73) Assignee: Mitel Networks Corporation, Ottawa (CA)

( * ) Notice: Subject to any disclaimer, the term of this patent is extended or adjusted under 35 U.S.C. 154(b) by 26 days.

(21) Appl. No.: 16/419,498

(22) Filed: May 22, 2019

(65) Prior Publication Data

US 2020/0374398 A1    Nov. 26, 2020

(51) Int. Cl.
| | |
|---|---|
| H04M 3/523 | (2006.01) |
| G06N 20/00 | (2019.01) |
| H04M 3/51 | (2006.01) |
| G06N 5/04 | (2006.01) |
| G10L 25/63 | (2013.01) |

(52) U.S. Cl.
CPC .......... H04M 3/5233 (2013.01); G06N 5/043 (2013.01); G06N 20/00 (2019.01); H04M 3/5116 (2013.01); H04M 3/5166 (2013.01); H04M 3/5235 (2013.01); G10L 25/63 (2013.01); H04M 2203/558 (2013.01)

(58) Field of Classification Search
CPC ............. H04M 3/5233; H04M 3/5166; H04M 2203/402; G06N 20/00; G10L 25/63
USPC ...................................................... 379/265.12
See application file for complete search history.

(56) References Cited

U.S. PATENT DOCUMENTS

| | | | |
|---|---|---|---|
| 6,411,687 B1 * | 6/2002 | Bohacek | H04M 3/51 379/201.11 |
| 8,214,214 B2 | 7/2012 | Bennett | |
| 8,767,948 B1 * | 7/2014 | Riahi | H04M 3/5235 379/266.08 |

(Continued)

OTHER PUBLICATIONS

Campbell, Colin: "The New Rules For Skills-Based Routing", www.callcenterhelper.com, Oct. 31, 2017.

(Continued)

*Primary Examiner* — Ahmad F. Matar
*Assistant Examiner* — Jirapon Intavong

(57) ABSTRACT

An electronic communication method and system are disclosed. Exemplary methods include rating agent soft skills using an artificial intelligence (AI) module that continuously evaluates these skills, based on artifacts available from previous interactions with customers. The artifacts can be the voice recordings, chat transcripts, as well as Key Performance Indicators (KPIs) used for reporting. Once agents are rated, targeted soft skill-based routing is implemented for high priority calls or calls that are detected by a sentiment analyzer as requiring special attention. For training purposes, the system can be configured to route calls to agents with lower soft skills ratings during off hours. Completed calls may be used as further feedback to the AI module and the soft skill ratings acquired by the AI module may be added to an existing "hard skills" dataset for contact center call routing, to assist with continuous learning of soft skills as well as agent and supervisor training.

20 Claims, 5 Drawing Sheets

(56) References Cited

U.S. PATENT DOCUMENTS

| | | |
|---|---|---|
| 10,171,659 B2 | 1/2019 | Riahi et al. |
| 10,237,420 B1 | 3/2019 | Wu et al. |
| 2003/0231472 A1 | 12/2003 | Tseng et al. |
| 2009/0232296 A1* | 9/2009 | Jaiswal .................. H04M 3/54 379/265.12 |
| 2014/0314225 A1 | 10/2014 | Riahi et al. |
| 2015/0189085 A1 | 7/2015 | Riahi et al. |
| 2018/0278750 A1* | 9/2018 | Avila .................. H04M 3/5158 |
| 2020/0195779 A1* | 6/2020 | Weisman ................ G06F 40/30 |

OTHER PUBLICATIONS

Interactive Intelligence, Inc.: "Deriving Value from Skills-Based Routing", 2012, Rev. 12/12, Version 1.

Campbell, Colin, "The New Rules for Skills-Based Routing" OLIVE.com, Oct. 19, 2017; Re-published on Oct. 27, 2017 at: https://www.callcentrehelper.com/the-new-rules-for-skills-based-routing-117980.htm.

Interactive Intelligence, Inc., Whitepaper: "Deriving Value from Skills-Based Routing: A Guide to Implementing Skills-Based Routing Effectively" (2012).

\* cited by examiner

METHOD AND SYSTEM FOR SOFT SKILLS-BASED CALL ROUTING IN CONTACT CENTERS

FIELD OF INVENTION

The present disclosure generally relates to contact centers, and more particularly to a method and system for soft skills-based call routing in contact centers.

BACKGROUND

Call center agents are on the front lines of customer relationship management, entrusted with not only providing customers with relevant help in a timely manner but also the demanding task of pleasing and appeasing customers. With a great number of situations that may arise in a customer service exchange, agents need to be versatile and equipped with a strong skill set to handle the complexity of customer needs. An agent's soft skills are critical in handling customers and 'exceptional' situations such as when a caller has been waiting in queue and is becoming impatient.

As used herein, "soft skills" are defined as core interpersonal skills that are highly desirable for a contact center agent, but often difficult to evaluate and develop on a professional basis. Soft skills include, but are not limited to, patience, empathy and timeliness.

Patience is necessary when dealing with customer frustration. Agents should give customers a chance to explain their situation in full and never interrupt or react negatively to an unhappy customer. Agents should also put customers at ease by explaining a solution calmly and patiently while remembering that customers do not always possess the technical knowledge needed to resolve an issue.

Empathy is among the most important of customer service skills. A frustrated customer requires attention and reassurance, but even satisfied customers need attention. For example, simply acknowledging concern for timeliness (quick delivery) and relevant promotional offers (not sending too many or unwanted marketing messages) shows consideration and respect for customers.

Timeliness is critical for customer service. Agents should be swift in responding to inquiries and be prepared to switch escalate a call if it requires more attention.

Current contact or call center solutions typically assign an incoming call to the first available agent or, if skills-based routing is available, to the last agent contacted by the caller. In any event, such solutions do not take an agent's soft skills into account before routing the call, which can cause some calls to be redirected to an agent who is not best suited to handle the call. This can lead to poor customer satisfaction, longer call duration and higher contact center costs.

Another aspect of the problem with current contact or call center solutions is the lack of a deterministic process to ascertain which agents require training plans to develop soft skills and which of such soft skills are lacking. This results in less efficient and imprecise training. It would be desirable to evaluate an agent's or supervisor's interactions with customers on a set of soft skills, in order to provide contact center managers with data from which to plan comprehensive and efficient training plans which, in turn, boost efficiency.

Intelligent call routing has been implemented in current contact centers based primarily on predefined agent hard skills (i.e. language, domain expertise, location, knowledge about products and services) and does not take soft skills such as patience, timeliness, empathy, positive attitude, etc. into account before routing of calls takes place. To address this shortcoming, supervisors and/or managers have resorted to manual application of interaction artifacts such as recordings or transcripts to determine an agent's skills, with attention being paid to calls that have been "escalated". The problem with this manual solution is that it is a tedious and inefficient process. There is a lack in the prior art of any programmatic and automated process for rating an agent's skills, for use in better serving of customers. This lack of a rating process presents an obstacle to the continuous adjustment and improvement of contact center agents' skills.

Accordingly, improved methods and systems for contact center call routing based on assessing agent soft skills, are desired.

BRIEF DESCRIPTION OF THE DRAWING FIGS

Subject matter of the present disclosure is particularly pointed out and distinctly claimed in the concluding portion of the specification. A more complete understanding of the present disclosure, however, may best be obtained by referring to the detailed description and claims when considered in connection with the drawing Figures.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The present specification relates generally to contact or call center methods and systems. According to an aspect of this specification, a method and system are set forth for rating agent soft skills using an artificial intelligence (AI) module that continuously evaluates these skills, based on all artifacts available from previous interactions with customers. The artifacts can be the voice recordings, chat transcripts, as well as Key Performance Indicators (KPIs) used for reporting. Once agents are rated or weighed, targeted soft skill-based routing is implemented for high priority calls or calls that are detected by a sentiment analyzer as requiring special attention. For example, if the sentiment analyzer determines that an important customer is becoming impatient, the routing system can bypass regular skills-based routing and route the call to an agent with a high soft skills rating. For training purposes, the system can also be configured to calls route to agents with lower soft skills ratings during off hours. Completed calls may be used as further feedback to the AI module and the soft skill ratings acquired by the AI module may be added to an existing "hard skills" dataset for contact center call routing, to assist with continuous learning of soft skills as well as agent and supervisor training.

Figure 1:
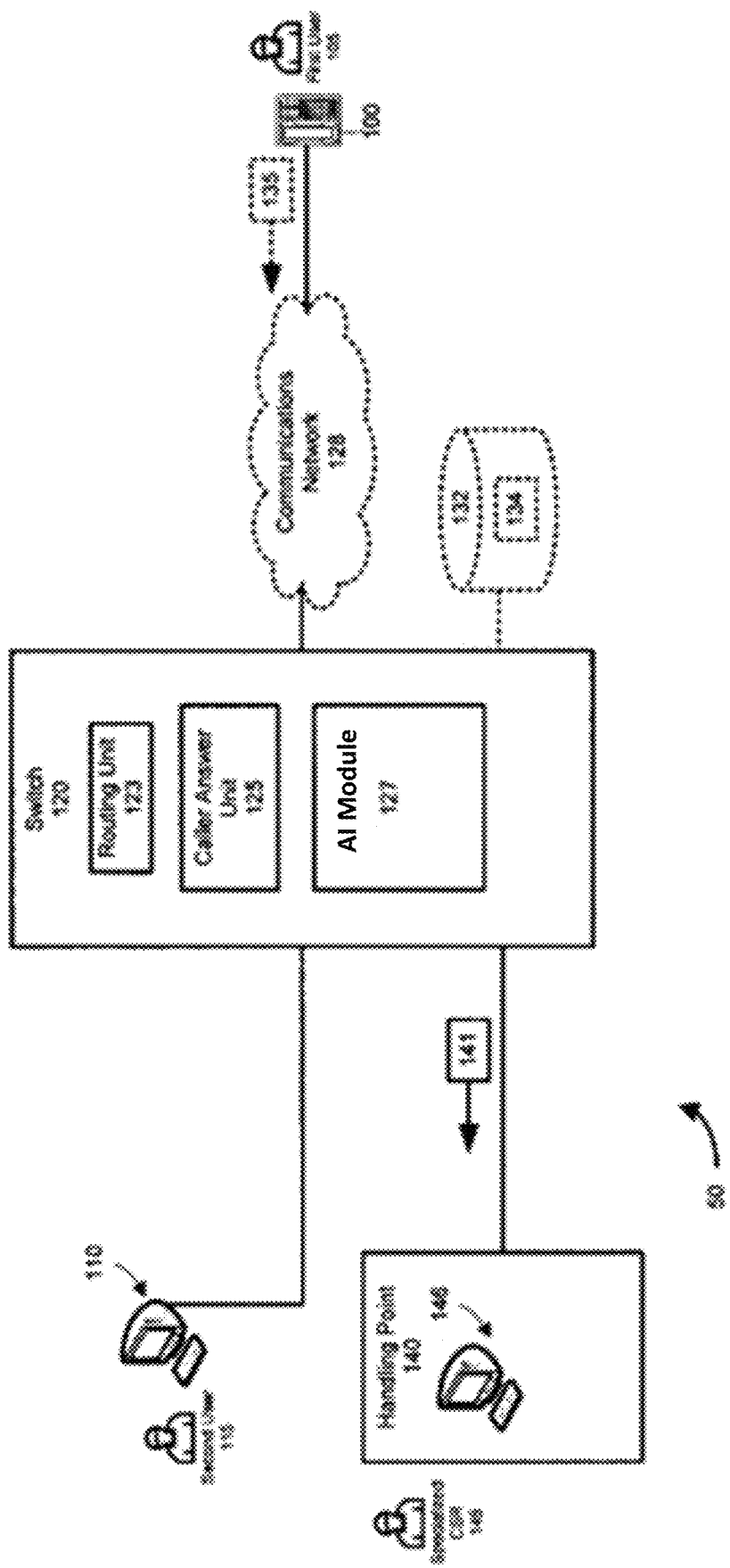
FIG. 1 illustrates an electronic communication system in accordance with various exemplary embodiments of the disclosure.

FIG. 1 depicts a system 50 for managing a call, and specifically a call between a communication device 100 associated with a first user 105 and a communication device 110 associated with a second user 115 or a communication device 146 associate with a specialized user 145 possessing enhanced soft skills using. In general, in some embodiments, the first user 105 may comprise a customer or potential customer of an entity (e.g. a business, a contact center, etc.), and the second and specialized users 115 and 145 may be employees associated with the entity (e.g. a business or a contact center engaged in call answering for the business). However, in other embodiments, the first user 105 and the second and specialized users 115 and 145 may be employees of the entity (e.g. the first user 105 being an employee with a work-related question, and the and specialized users 115 and 145 being part of a human resources team, for example). In further embodiments, the first user 105 and the second and specialized users 115 and 145 may be connected for voice communications by a switch 120, for example a cloud or IP-based Private Branch Exchange (PBX)).

The call is managed via the switch 120, which comprises logical and physical components for managing calls, which will be described hereafter with reference to embodiments. The switch 120 comprises a routing unit 123 for routing calls, including incoming calls, outgoing calls and internal calls. In some embodiments, the switch 120 is connected to incoming lines via a communications network 128. In these embodiments, the communications network 128 may comprise a switched network (e.g. the PSTN) and/or a packet-based network (e.g. the Internet), the switch 120 being enabled for managing calls via the communications network 128, and the routing unit 123 enabled for routing calls to and from the communications network 128. Embodiments described are not limited, however, to whether the calls are packet based or PSTN based.

In a specific non-limiting embodiment, the second and specialized users 115 and 145 are customer service representatives (CSRs) of a contact center, and the first user 105 comprises a customer, or a potential customer, engaged in a call to the contact center. The switch 120 manages the contact center's calls including, but not limited to, routing calls to CSRs, managing a hold queue, managing a call queue, and interacting with the user 105 via a caller answer unit 125. In this embodiment, the CSR may be one of a plurality of CSRs (not depicted), and the switch 120 may be connected to a plurality of incoming lines and/or communication networks, the switch 120 managing a plurality of calls and assigning calls to CSRs based on rules governed by criteria such as availability, hard skills and soft skills, as discussed in greater detail below. Furthermore, some calls may be calls initiated by the first user 105 (i.e. the customer) to the call center using the communication device 100, while other calls may be calls initiated by the call center to the first user 105. In any event, the switch 120 controls the connection of the communication device 100 to the communication device 110 based on a set of call center rules, as discussed above.

Figure 3:
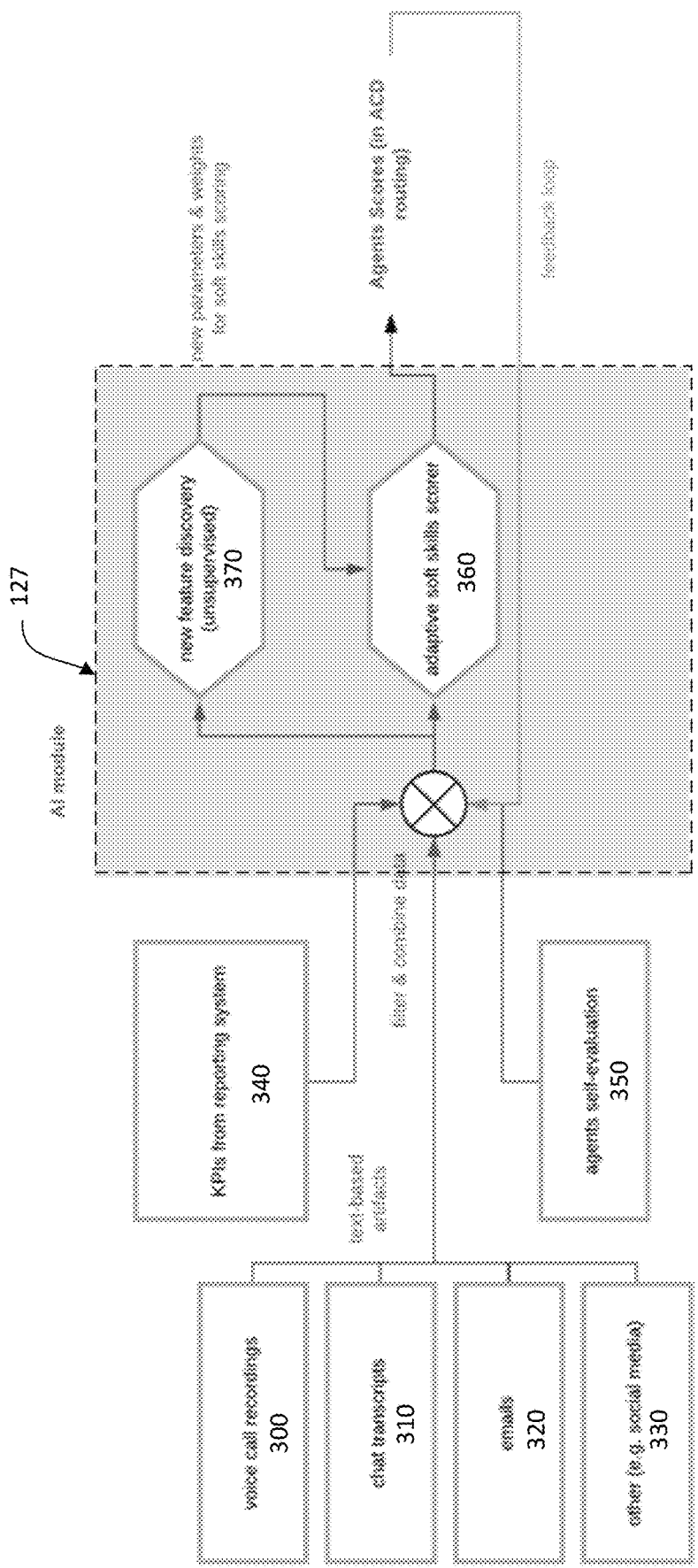
FIG. 3 shows additional details of an artificial intelligence (AI) module of the system for soft skills-based call routing shown in FIG. 2, in accordance with further exemplary embodiments of the disclosure.

According to an embodiment, an artificial intelligence module 127 is provided for rating and continuously evaluating agent soft skills based on artifacts 134 that are available from previous interactions with customers. As illustrated in FIG. 3, the artifacts can be voice recordings 300, chat transcripts 310, email 320, and other content, such as social media 330, as well as Key Performance Indicators 340 used for reporting and agent interaction evaluation 350, all of which may be stored in a database 132.

Figure 2:
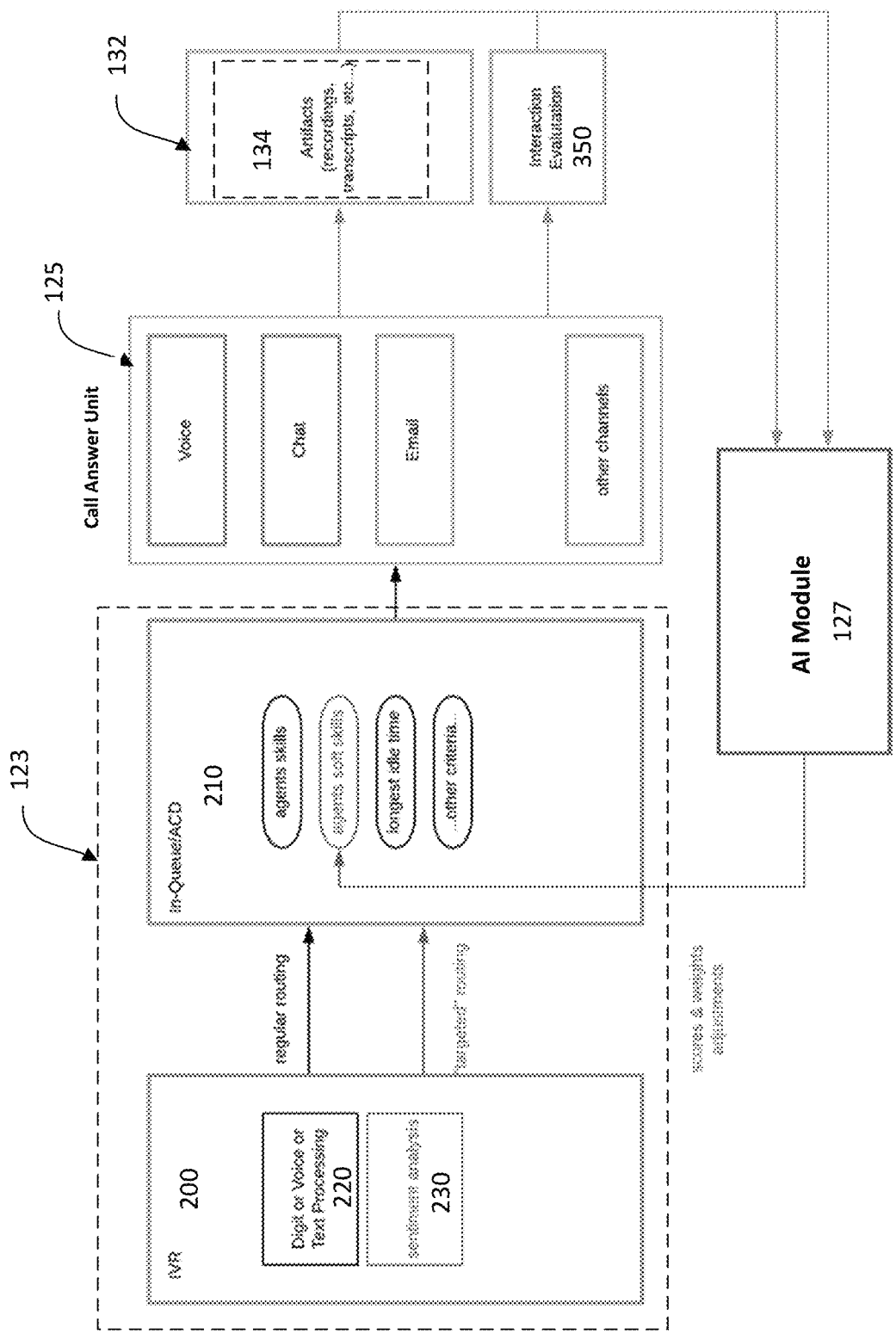
FIG. 2 illustrates a system for soft skills-based call routing that can be used with an electronic communication system as shown in FIG. 1 in accordance with additional exemplary embodiments of the disclosure.

As shown in FIG. 2, the routing unit 123 includes an Interactive Voice Response (IVR) module 200 and an In-Queue/Automatic Call Distributor (ACD) module 210 for routing calls from the first user 105 to one of either the second user 115, via regular routing, or to specialized user 145 having enhanced soft skills, via targeted routing 141 through a call handling point 140, based on criteria such as agent skills (hard and soft), longest idle time, availability, etc.

According to an aspect of this disclosure, IVR module 200 includes a processor 220 for processing digit/voice/text of an incoming call as well as a sentiment analyzer 230 for detecting prosodic data relating to intonation, tone, stress and/or rhythm indicative of the emotional state of the caller (see for example, U.S. Pat. No. 8,214,214 (Bennett)). The processor 220 and sentiment analyzer 230 function together with In-Queue/ACD module 210 to provide one of either regular or 'targeted' routing of the incoming call to the appropriate user 115 or 145 based on the criteria set forth above.

In particular, as described in greater detail below, once agents (such as user 145) are rated or weighed according to their soft skills, they can participate in soft skills-based routing (i.e. targeted routing 141) for high priority calls or calls that are identified by sentiment analyzer 230 as requiring special attention. The collected artifacts 134 from these targeted calls are further used as feedback to the AI module 127 for generating and continuously adjusting agent skill scores and weights to promote continuous learning of soft skills.

Thus, as shown in FIG. 2, AI module 127 adds the computed agent scores and weights (i.e. soft skill ratings) to the existing skills in the contact center In-Queue/ACD module 210 for routing and agent (and supervisor) training.

As discussed above, sentiment-analyzer 230 is used to determine the "tone" of an ongoing call, so that the call can be appropriately routed by the In-Queue/ACD module 210. For example, the In-Queue/ACD module 210 can bypass (or supplement) regular skills-based routing and involve an agent with the highest soft skills rating in circumstances where the sentiment analyzer 230 indicates that an important customer is becoming impatient. As result of the feedback path from the AI module 127 to In-Queue/ACD module 210, the agent's ratings are automatically adjusted during such calls.

Returning to FIG. 3, additional details of the AI module 127 are shown. In general, AI module 127 receives input training parameters gleaned from artifacts 134 (stored in database 132), and interaction evaluation data 350. The interaction evaluation data 350 can be, for example, agent self-evaluation, user feedback and/or contact center supervisor rating, while artifacts 134 can be, for example, recordings and transcripts of agent interactions with customers. The AI module 127 utilizes heuristics for classifying and weighting the input training parameters to parameterize agent soft skills. As discussed above, the AI module 127 learns and rates soft skills such as patience, empathy and timeliness, but may also be trained to learn and weight additional skills as the data converges and improves, to accommodate other parameters that may be relevant to an organization's business.

Various input training parameters may be used by the AI module 127 to rate and weight agent soft skills. For example, patience can be measured by collecting interaction evaluation data 350 such as customer call ratings, or by detecting how often the agent interrupts the customer while talking. Empathy can be measured by detecting, via the sentiment analyzer 230, how the tone (i.e. sentiment) of the call changes from start of call to end of call. If the detected sentiment data changes from negative to positive, the interaction is deemed to be favorable. Timeliness can be classified programmatically based on how quickly an agent 'wraps up' a call (i.e. by detecting the delay in responses and the end outcome).

Thus, once a call has been completed, feedback from the various artifacts 134 and interaction evaluation data 350 are transmitted to the AI engine 127 to adjust the agent's soft skills ratings. This metric is then fed back from the AI module 127 to In-Queue/ACD module 210 for improved routing of future calls.

Within the AI module 127, a soft skills scorer 360 starts with pre-built parameters to compute an agent's different soft skills scores. An unsupervised learner module 370 uses the same inputs to add new parameters over time that are determined to be relevant to the scoring process and feeds them to the scorer 360. Once the soft-skill scores are calculated, they are fed to the In-Queue/ACD module 210 for future routing decisions. The output of the In-Queue/ACD module 210 is, in turn, fed back into the 360 scorer and the unsupervised learner module 370 to determine how much impact they have had on the ACD process.

Figure 4:
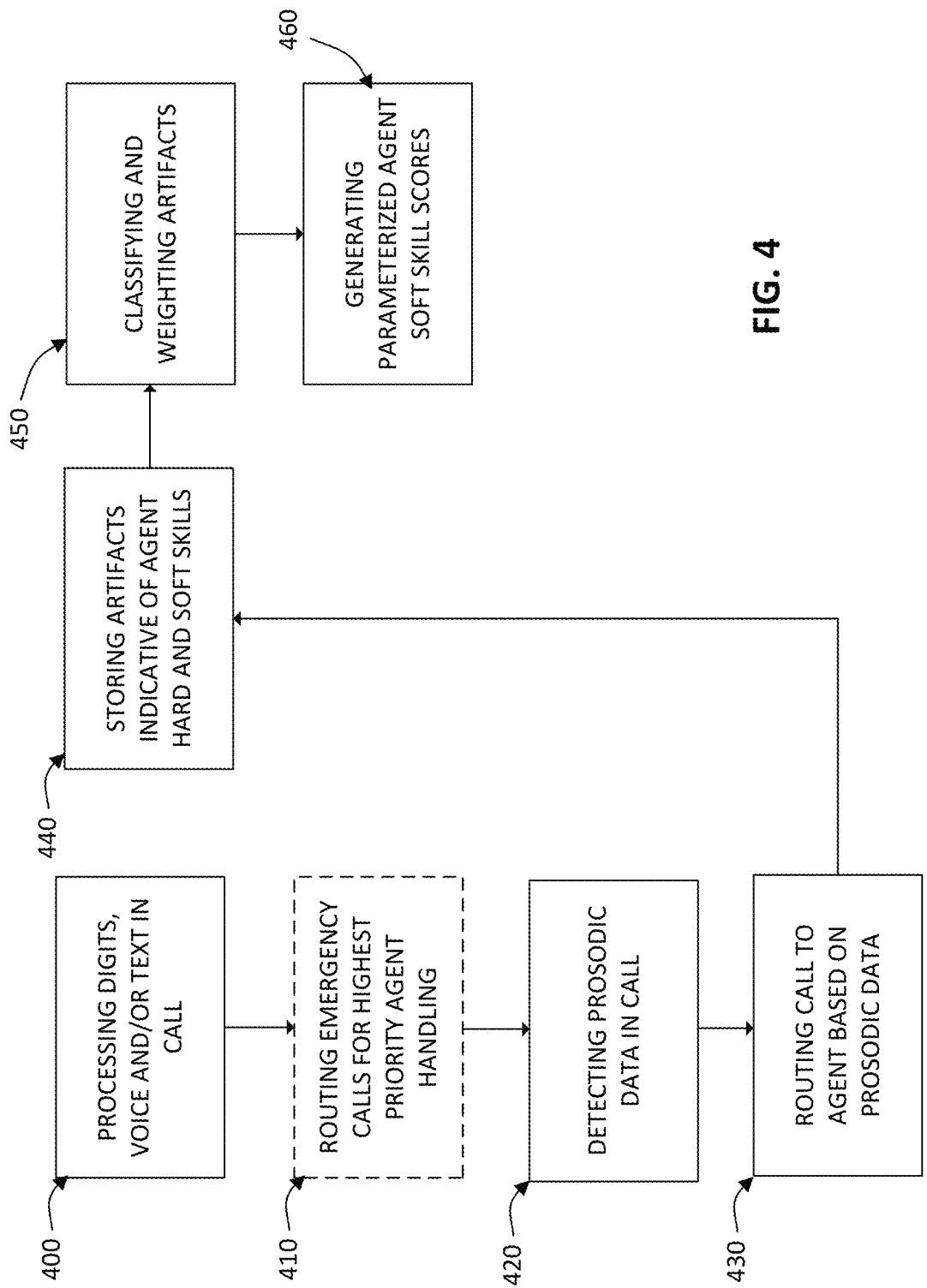
FIG. 4 is a flowchart showing a method for soft skills-based call routing according to an additional aspect.

With reference to FIG. 4, a method for soft skills-based call routing is illustrated, according to an embodiment. Upon receipt of an incoming call at switch 12, processor 220 processes one or more of digits, voice and text of incoming calls, at step 400. Optionally, at 410, the call can be routed for emergency answering by the highest priority agent (i.e. by an agent who is specially trained to handle situations that are deemed critical or for situations requiring specialized soft skills).

At step 420, sentiment analyzer 230 detects prosodic data in the incoming calls indicative of caller emotional state. In-Queue/Automatic Call Distributor (ACD) module 210 then routes the incoming call for agent answering using one of either regular routing based on said one or more digits, voice and text, or targeted routing based on said prosodic data, at step 430.

At step 440, artifacts indicative of agent hard skills and soft skills (artifacts 134) are stored in database 132, based on the completed call. AI module 127 then classifies and weights the artifacts at step 450, and generates parameterized agent soft skill scores, at step 460, for improved routing of future calls. The classifying and weighting at step 450 may include collecting at least one of interaction evaluation data 350, and incidents of agent interruptions for generating a parameterized agent soft skill score for the patience soft skill. As discussed above, the parameterized agent soft skill scores may be indicative of other soft skills such as empathy and timeliness. The interaction evaluation data 350 may include customer call ratings.

Thus, in some embodiments the classifying and weighting at step 450 may include detecting how prosodic data changes from the start of an incoming call to the end of the call, to generate a parameterized agent soft skill score for empathy or detecting duration of the incoming call to generate a parameterized agent soft skill score for timeliness.

In a further embodiment, incoming calls may be routed to an agent with low soft skills during off hours.

Figure 5:
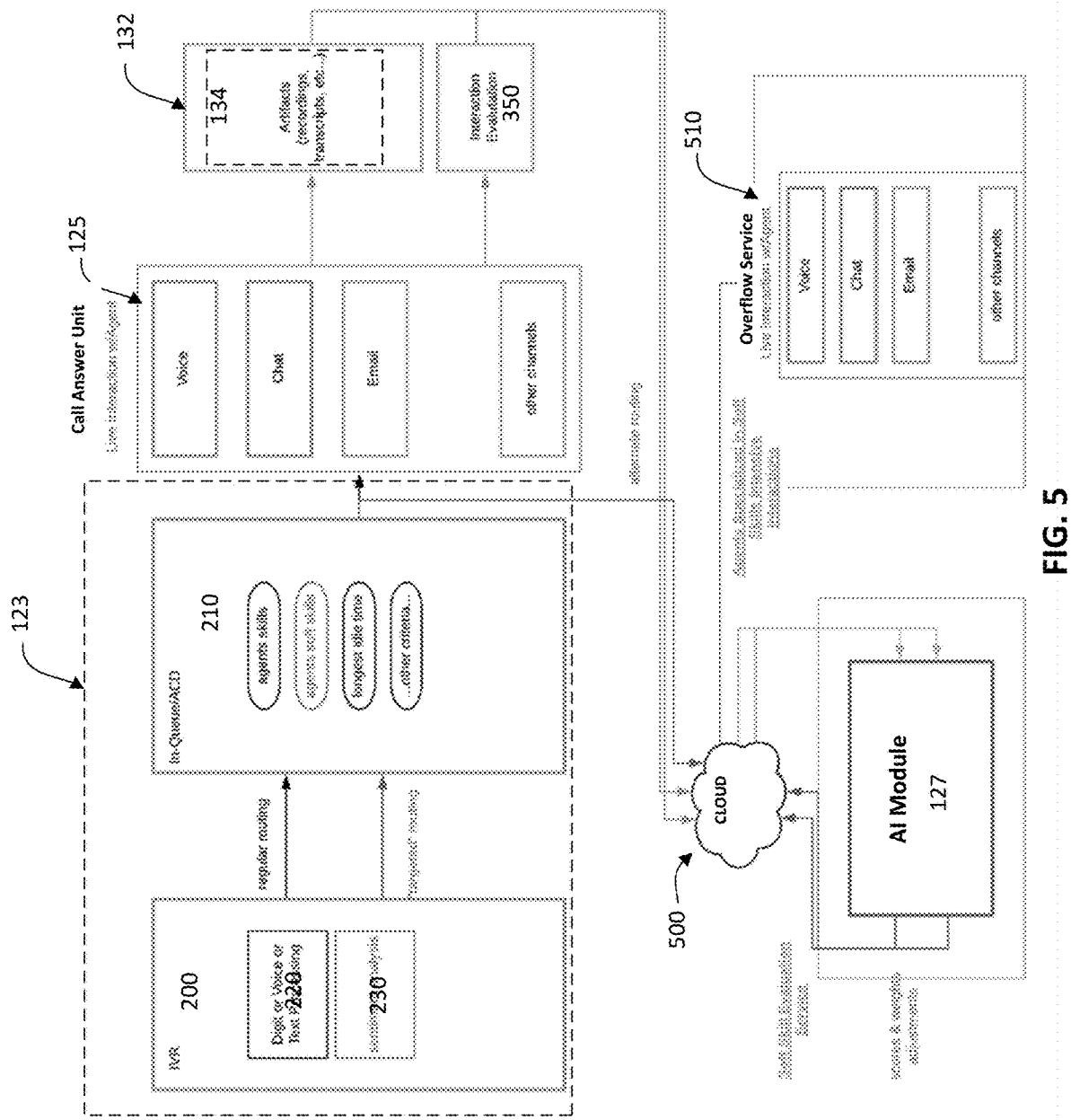
FIG. 5 illustrates a cloud-based system for soft skills-based call routing that can be used with an electronic communication system as shown in FIG. 1 in accordance with alternative exemplary embodiments of the disclosure.

The principles set forth above may be implemented as an on-premise solution, as shown in FIG. 2, or as a cloud-based solution, as shown in FIG. 5. Implementation over the cloud 500 has a particular advantage in that the AI module 127 does not depend on the specific vertical or domain of a business. All businesses that need a contact center, will need similar soft skills for customer care, irrespective of the nature of the business. For example, a hospital and a bank both require their customer care professionals to have soft skills such as "patience, timeliness, empathy" to better serve their customers. Thus, a third-party AI engine (e.g. Google AI) can be leveraged as a basic machine learning framework to which rules/constraints can be applied for soft skills learning, such that different contact centers can use the service for different tenants without consideration of the tenant's domain of work. Also, because multiple contact centers can utilize the same cloud-based AI engine, a larger and varied training data set is available for the AI module 127 learn from, resulting in greater speed and accuracy.

It is also contemplated that an overflow server 510 can be provided for highest priority agent answering in cases of emergency by providing agents who are specially trained to handle situations that are deemed critical or for situations requiring specialized soft skills.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. For example, although steps of methods are listed in a particular order, the steps need not be performed in the illustrated order and some steps may be performed simultaneously. These and other changes or modifications are intended to be included within the scope of the present invention, as expressed in the following claims.

We claim:

1. A system for soft skills-based call routing, the system comprising:
    an interactive voice response module for receiving an incoming call;
    a sentiment analyzer for detecting prosodic data in the incoming call indicative of a caller's emotional state;
    an automatic call distributor module for routing the incoming call to an agent based on the prosodic data;
    a database for storing artifacts indicative of agent soft skills based on all calls in which the agent participates; and
    an artificial intelligence module that continuously updates a soft skills score of the agent based on all calls in which the agent participates, and after each call in which the agent participates the artificial intelligence module automatically communicates an updated soft skills score of the agent to the automatic call distributor module for routing a future incoming call, wherein the artificial intelligence module further includes (a) a soft skills scorer for receiving the artifacts and in response computes agent soft skills scores, and (b) an unsupervised learner module configured to receive the artifacts and in response adding and feeding one or more new parameters to the soft skills scorer.

2. The system of claim 1, wherein the artifacts include one or more of voice recordings, chat transcripts, and key performance indicators.

3. The system of claim 1, further comprising an overflow server for routing emergency incoming calls to the highest priority agent in cases of emergency by providing agents who are specially trained to handle situations that are deemed critical or for situations requiring specialized soft skills.

4. The system of claim 1, wherein the agent soft skill scores are indicative of one or more of patience, empathy and timeliness.

5. The system of claim 1, wherein the soft skills score of the agent are based at least in part on interaction evaluation data that includes customer call ratings.

6. The system of claim 1, wherein the artificial intelligence module detects how said prosodic data changes from the start of the incoming call to the end of the incoming call to assist in generating a parameterized agent soft skill score for empathy.

7. The system of claim 1, wherein the artificial intelligence module detects a duration of the incoming call to generate a parameterized agent soft skill score for timeliness.

8. The system of claim 1, wherein the artifacts comprise one or more of: the agent's feedback of his/her performance and supervisor evaluation.

9. The system of claim 1, wherein the one or more new parameters are one or more soft skills.

10. A method for soft skills-based call routing, the method comprising:
  receiving an incoming call;
  detecting prosodic data in the incoming call, wherein the prosodic data is indicative of a caller's emotional state;
  routing the incoming call to an agent using (a) a regular routing, or (b) bypassing the regular routing and using a targeted routing to an agent with an appropriate soft skills score for the prosodic data of the caller detected by the sentiment analyzer;
  storing artifacts indicative of agent soft skills based on all of the agent's completed calls; and
  continuously classifying and weighting the artifacts from each of the agent's completed calls to automatically generate an updated soft skills score of the agent after each of the agent's completed calls and using the updated soft skills score of the agent to route a future call to the agent, wherein the artifacts are received by a soft skills scorer and by an unsupervised learner module and based on the received artifacts (a) the updated soft skills score is generated by the soft skills scorer, and (b) one or more new parameters are added to the soft skills scorer by the unsupervised learner module.

11. The method of claim 10, wherein soft skill score is indicative of soft skills including one or more of patience, empathy and timeliness.

12. The method of claim 10 that further comprises the step of collecting at least one of interaction evaluation data and incidents of agent interruptions to generate a parameterized agent soft skill score for patience.

13. The method of claim 12, wherein the interaction evaluation data includes customer call ratings.

14. The method of claim 10 that further comprises the step of detecting how said prosodic data changes from the start of the incoming call to the end of the incoming call to generate a parameterized agent soft skill score for empathy.

15. The method of claim 10 that further comprises the step of routing, during off hours, the incoming call to an agent with low soft skills.

16. The method of claim 10 that further comprises the step of routing emergency incoming calls to the highest priority agent in cases of emergency by providing agents who are specially trained to handle situations that are deemed critical or for situations requiring specialized soft skills.

17. The method of claim 10, wherein a future call is routed to the agent, and artifact input from the future call is routed by the automatic call distributor to an artificial intelligence module, wherein the artificial intelligence module determines how much impact the updated soft skills score of the agent had on routing the future call.

18. The method of claim 10, wherein the artifacts comprise one or more of: the agent's feedback of his/her performance and supervisor evaluation.

19. The method of claim 10, wherein the one or more new parameters are one or more soft skills.

20. A non-transient computer readable medium comprising program instructions for causing a computer to perform the method of: processing one or more of digits, voice and text of an incoming call; detecting prosodic data in the incoming call, wherein the prosodic data is indicative of a caller's emotional state; routing the incoming call to an agent using (a) regular routing based on the one or more digits, voice and text, or (b) bypassing the regular routing and using targeted routing to an agent with a high soft skills rating appropriate for the prosodic data detected by a sentiment analyzer; storing in a database artifacts of all calls in which the agent participates, wherein the artifacts are indicative of agent hard skills and soft skills; using an artificial intelligence module to continuously update a soft skills score of the agent based on all calls in which the agent participates, and after each call in which the agent participates automatically communicating an updated soft skills score of the agent to an automatic call distributor module; and the automatic call distributor module routing a future call to the agent based on the updated soft skills score of the agent, and routing artifact input from the future call to the artificial intelligence module, wherein the artificial intelligence module determines how much impact the updated soft skill score of the agent had on routing the future call.

* * * * *